US012643501B2

(12) United States Patent
Reinhart

(10) Patent No.: US 12,643,501 B2
(45) Date of Patent: Jun. 2, 2026

(54) ACCESS CONTROL FOR A MOTOR VEHICLE

(71) Applicant: Bayerische Motoren Werke Aktiengesellschaft, Munich (DE)

(72) Inventor: Lukas Reinhart, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2 days.

(21) Appl. No.: 18/882,889

(22) Filed: Sep. 12, 2024

(65) Prior Publication Data

US 2025/0121795 A1    Apr. 17, 2025

(30) Foreign Application Priority Data

Oct. 13, 2023    (DE) .................... 10 2023 128 008.2

(51) Int. Cl.
*B60R 25/24*       (2013.01)
*G07C 9/00*        (2020.01)
*H04L 9/08*        (2006.01)

(52) U.S. Cl.
CPC ........ *B60R 25/241* (2013.01); *G07C 9/00309* (2013.01); *H04L 9/08* (2013.01)

(58) Field of Classification Search
CPC ...... B60R 25/241; G07C 9/00309; H04L 9/08
USPC ........................................................ 340/5.72
See application file for complete search history.

(56) References Cited

U.S. PATENT DOCUMENTS 9,911,255 B2 *  3/2018  Lee ........................... G07C 9/27
11,128,478 B2 *  9/2021  Galdo ................... H04L 9/3263

| | | | |
|---|---|---|---|
| 11,949,779 B2 * | 4/2024 | Lim | ...................... H04L 9/3213 |
| 12,041,169 B2 * | 7/2024 | Jung | ......................... H04L 9/14 |
| 12,088,700 B2 * | 9/2024 | Lim | ...................... H04L 9/088 |
| 2021/0409200 A1 * | 12/2021 | Lim | ...................... H04L 9/3213 |
| 2022/0094676 A1 | 3/2022 | Hofmann | |
| 2023/0322185 A1 | 10/2023 | Lerch et al. | |

FOREIGN PATENT DOCUMENTS

DE     10 2015 122 469 A1     6/2017
DE     10 2019 101 120 A1     7/2020

OTHER PUBLICATIONS

German-language Search Report issued in German Application No. 10 2023 128 008.2 dated May 7, 2024 with partial English translation (10 pages).
"Digital Key Technical Specification", Car Connectivity Consortium Digital Key Release 3, Version 1.1.0 (CCC-TS-101), Jul. 20, 2022, pp. 1-505 (505 pages).

* cited by examiner

*Primary Examiner* — Nam V Nguyen
(74) *Attorney, Agent, or Firm* — Crowell & Moring LLP

(57)                ABSTRACT

A method for controlling access to a motor vehicle includes the steps of receiving a tracking request for a new digital key for a motor vehicle, wherein the new digital key is included in a chain of digital keys that have been created from one another, and wherein the tracking request includes a chain of attestation packages that are assigned to the digital keys in pairs; determining that a digital key to which one of the attestation packages of the chain is assigned has already been authenticated with respect to the motor vehicle; removing from the chain an attestation package that is assigned to a digital key that precedes the determined key in the chain; and providing a tracking response with at least one remaining attestation package.

15 Claims, 3 Drawing Sheets

400

405

ACCESS CONTROL FOR A MOTOR VEHICLE

CROSS REFERENCE TO RELATED APPLICATION

This application claims priority under 35 U.S.C. § 119 from German Patent Application No. DE 10 2023 128 008.2, filed Oct. 13, 2023, the entire disclosure of which is herein expressly incorporated by reference.

BACKGROUND AND SUMMARY

The present invention relates to access control for a motor vehicle. In particular, the invention relates to access control by means of a digital vehicle key.

Access to a motor vehicle may be protected by means of a digital key. The digital key may be stored on a device, for example a smartphone. The device and the motor vehicle can authenticate one another, and a request to use a predetermined function of the motor vehicle can be executed upon successful authentication.

An owner of the motor vehicle may pass a permission to use the whole motor vehicle or only a predetermined function to a friend. In order to create a valid key for the friend, a predetermined exchange procedure can be carried out, which includes communication with a central entity that can manage keys for the motor vehicle. A tracking service can be implemented to document when which keys with authorizations were active for which functions of a motor vehicle. If a key is to be passed from an owner to a friend, the friend can be recorded or documented with the tracking service. A newly created key cannot become valid until the tracking service has confirmed the key.

A key can be used to issue or sign another key so that it is valid. The additional key may also have the permission to generate keys, and so a chain of keys can be created gradually, with each key being derived based on its predecessor in the chain. A key can be assigned an attestation package, which can be checked by the motor vehicle when the key is presented at the motor vehicle for the first time. The attestation package may refer to a preceding key in the chain. With regard to this key, a further attestation package can be provided, so that, with respect to the chain of keys, a chain of attestation packages may also exist, wherein the attestation packages are assigned to the key in pairs.

If a new key is presented at the vehicle, it may be necessary to present the complete chain of attestation packages. In this case, an attestation package may take up multiple times more memory space than a digital key. Wireless transmission of the chain of attestation packages may take a certain amount of time, which increases as the chain length increases. A user may have to wait a relatively long time for all necessary checks to be performed before they may access the motor vehicle. In addition, they may be unclear about the progress of the check during transmission. Both of these issues may be inconvenient for the user.

An object on which the present invention is based is to provide a technique which allows a faster initial check of a digital key that is tracked by a tracking service. The invention achieves this object by means of the subjects of the independent claims. Preferred embodiments are specified in dependent claims.

According to a first aspect of the present invention, a method for controlling access to a motor vehicle comprises the steps of receiving a tracking request for a new digital key for a motor vehicle; wherein the digital key is included in a chain of digital keys that have emerged from one another; wherein the tracking request includes a chain of attestation packages that are assigned to the keys in pairs; determining that a key to which one of the attestation packages of the chain is assigned has already been authenticated with respect to the motor vehicle; removing from the chain an attestation package that is assigned to a key that precedes the specified key in the chain; and providing a tracking response with at least one remaining attestation package.

A technique described herein advantageously builds on a concept known as a digital vehicle key or Digital Car Key. A specification of the Digital Car Key is published by the Car Connectivity Consortium and is available at the time of writing this document in version 1.1.0 of Jul. 20, 2022. In particular, reference is made to chapter 11.8 "Key Sharing Flow: Steps", 11.9 "Owner Device OEM Server Notification", 11.10 "Key Tracking and Online Attestation Delivery" and 11.11 "Vehicle Attestation". The possibility of chained attestation packages may correspond to a corresponding proposal ("chained attestations") for extending the standard. A technique described herein may be considered an extension proposal for this standard.

An owner is understood here as a person who is specifically assigned to the motor vehicle and holds particular permissions. These permissions may include, in particular, the creation or signing of another key for the motor vehicle. There may be several owners of the vehicle at one time. For a control or replacement method described herein, the owner acts by means of an owner device. The owner device preferably comprises a mobile device that is personally assigned to the owner, in particular a smartphone, a smart watch, a smart band, a tablet computer or a laptop computer. In order to use the owner device for a sensitive action under a technique described herein, it may be necessary for the owner to be authenticated with respect to the owner device. For this purpose, the owner may present a biometric feature or enter a secret (password, PIN). Authentication can be checked by an operating system of the mobile device.

A friend is understood here to be a person who is to be granted permission to use the motor vehicle. Like the owner, the friend is usually a natural person. With regard to a technique described herein, the friend preferably acts by means of a friend device that is preferably personally assigned to them, like the owner device is assigned to the owner. The friend may also be authenticated with respect to the friend device in order to trigger a security-sensitive operation within the scope of the technique described herein.

The designations "owner" and "friend" are taken from the documentation of the Digital Car Key and should not have a restrictive effect. A chain-like subcontracting of keys can thus be represented more easily with terms such as friend of a friend, etc. With reference to the issuing or subcontracting of a digital key, the owner could also be referred to as a transmitter, for example, and the friend as a receiver. The owner device could then preferably be referred to as a transmitter device and the friend device as a receiver device. In some cases, an owner or a friend may be in the form of a device rather than a natural person.

Here, it is simply stated that a motor vehicle communicates with a device, even though the communication is strictly speaking handled by a control apparatus on board the motor vehicle. The communication is preferably wireless, for which reason one or more different wireless interfaces may be provided by the motor vehicle. A preferred data interface includes Bluetooth (BT) or Bluetooth Low Energy (BLE); a preferred interface for relative positioning of a device relative to the motor vehicle preferably includes ultra-wideband (UWB). Furthermore, an interface for near-field communication (NFC) may be provided. A communicating device may use one or more such wireless interfaces.

Removing an attestation package from the assigned chain can reduce a volume of data that the friend must present to the motor vehicle in order to obtain initial access. Although the digital key may occupy relatively little memory space, an attestation package may require multiple times this space. Transmitted data include additional formatting and management data, which further increase the volume of data. A transmission speed to the motor vehicle may be limited, especially if transmission takes place via UWB. A chain of multiple attestation packages, together with a new key, may require a transmission time in the range of half a minute. A person presenting the key may not be prepared for such a long waiting time and an interface for providing a corresponding piece of information to the person may not be provided, especially if the key is stored on a handheld device (fob). The access attempt may then fail, even though all the technical requirements for its success have been met.

It has been recognized that knowledge of which key of a chain has already been authenticated at the motor vehicle may be provided by a manufacturer service or tracking service for digital keys of the motor vehicle. It is therefore proposed to remove superfluous attestation packages from such a location as part of a creation process for a new key.

All attestation packages that are assigned to a key that precedes the specified key in the chain are preferably removed from the chain. This makes it possible to save a maximized amount of redundant data. The chain of keys may include multiple keys, with in each case one key being able to be created based on its predecessor or being able to be signed thereby. The chain of attestation packages can be structured accordingly. An attestation package can be signed in each case with the key that precedes the key to which the package is assigned in the key chain.

In order to be able to use the motor vehicle with a new key, the new key and at least one attestation package are required. If the attestation package is signed with a key that has not yet been authenticated at the motor vehicle, another attestation package may be required in the chain. A technique described herein aims to keep the chain of the required attestation packages as short as possible.

More preferably, the key that is already authenticated with respect to the motor vehicle and that precedes the new key most closely in the chain is determined. For example, if keys zero, one, two, three, four, and five are provided in the chain, where key zero has no predecessor and is considered authenticated, a new key six can be created based on key five. If keys two and four are already authenticated, then key four of the authenticated keys in the chain is closest to the new key six. Accordingly, attestation packages that are signed with keys zero to three can be removed from the chain of attestation packages.

More preferably, a message indicating that a key has been authenticated with respect to the motor vehicle is received. The motor vehicle can transmit the message as soon as a wireless transmission of information becomes available. The message can be stored by the service in order to be able to determine later, when tracking a new key, which keys of a chain are already authenticated with the motor vehicle.

Such a message may be transmitted by the motor vehicle to the manufacturer service or tracking service upon or after the first authentication of a key with respect to the motor vehicle. The message may indicate that attestation packages that are assigned to the key have been successfully checked by the motor vehicle. In this case, a chain of attestation packages that is assigned to the key can be positively checked.

The tracking response is also preferably signed before it is provided. Thus, the motor vehicle is able to determine that the attached chain of attestation packages is sufficient to maintain predetermined protection against misuse.

A new key can be authenticated with respect to the motor vehicle; and attestation packages assigned to the key can be successfully checked by the motor vehicle. Access to the motor vehicle can only then be permitted. Access may include, for example, unlocking or opening a vehicle door or vehicle flap. Access may also relate to driving with the motor vehicle.

The new key and the attestation packages that are assigned to the key are preferably transmitted wirelessly to the motor vehicle. Different interfaces can be used for this purpose. In one embodiment, the key is transmitted by means of UWB or NFC. A transmission speed of the interface may be rather low, measured by the data volume to be transmitted.

According to another aspect of the present invention, a tracking service for tracking a digital key for controlling access to a motor vehicle comprises an interface for receiving a tracking request for a new digital key for a motor vehicle; and a processing unit. In this case, the digital key is included in a chain of digital keys that have emerged from one another; wherein the tracking request comprises a chain of attestation packages that are assigned to the keys in pairs. In this case, the processing unit is set up to determine that a key to which one of the attestation packages of the chain is assigned has already been authenticated with respect to the motor vehicle; and also to remove from the chain an attestation package that is assigned to a key that precedes the specified key in the chain. An interface for providing a tracking response with at least one attestation package is also preferably provided.

The processing unit is preferably set up to partly or fully carry out a method described herein. Another part of the method may be carried out by a processing unit of a control apparatus on board a motor vehicle. A processing unit may be of electronic design and include, for example, an integrated circuit, a programmable logic chip or a programmable microcomputer. The method may be implemented in the form of a configuration or as a computer program product with program code means for the processing unit. The configuration or the computer program product may be stored on a computer-readable data carrier. Features or advantages of the method can be applied to an apparatus or a system, or vice versa.

According to yet another aspect of the present invention, a control apparatus for a motor vehicle is set up to grant access to the motor vehicle when a new digital key has been authenticated and a chain of attestation packages assigned to the key has been successfully checked. The key and the attestation packages can be transmitted via a wireless interface, for example via UWB or NFC.

According to yet another aspect of the present invention, a motor vehicle comprises a control apparatus as described herein. The motor vehicle may include, in particular, an automobile, a truck or a bus.

According to yet another aspect of the present invention, a system comprises a tracking service described herein and a motor vehicle described herein.

The invention will now be described in more detail with reference to the attached drawings, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
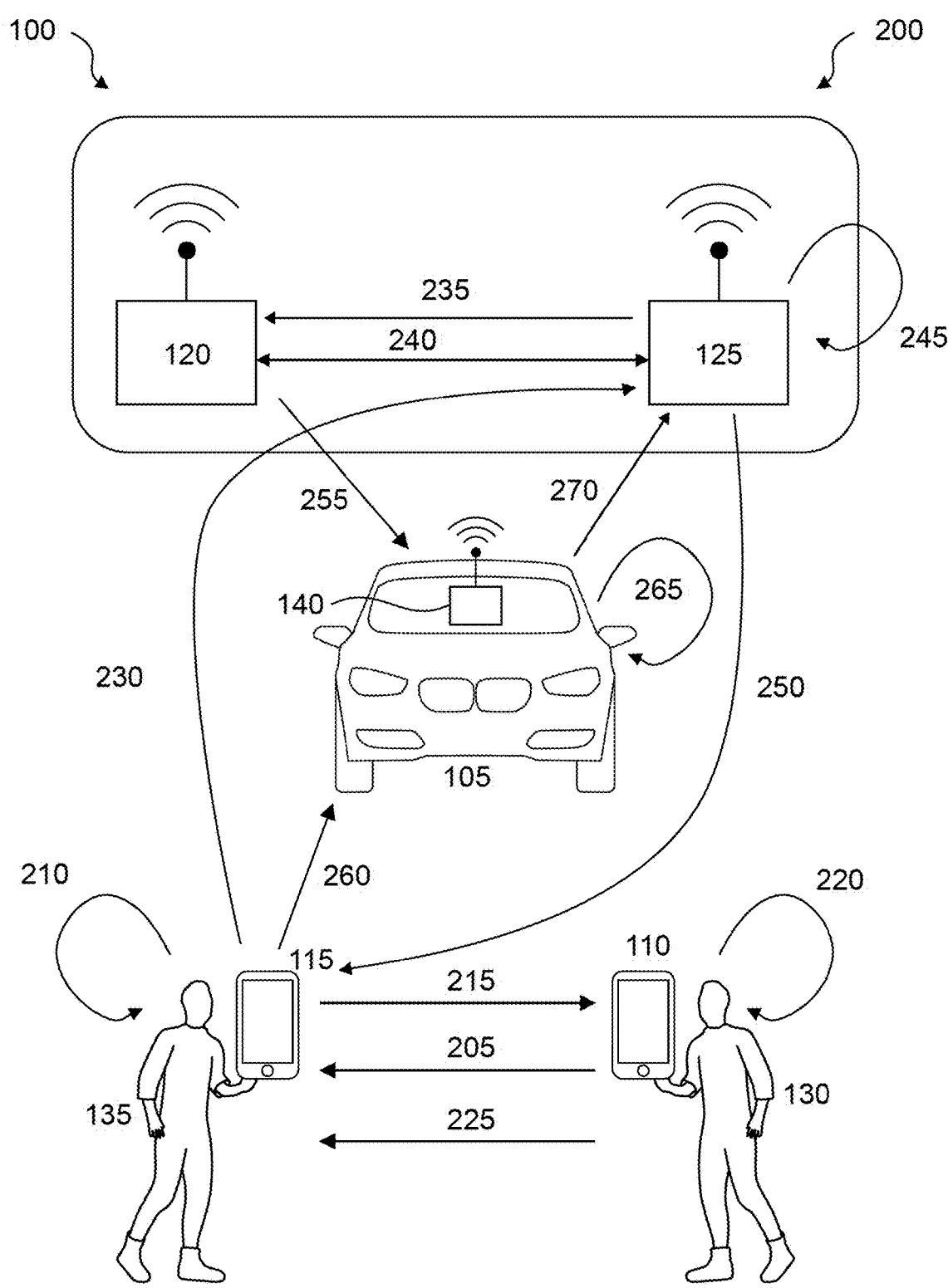
FIG. 1 illustrates a system and a first method.

FIG. 1 shows a system 100 for controlling access to a motor vehicle 105. The system 100 comprises the motor vehicle 105, an owner device 110, a friend device 115, a manufacturer service 120 and a tracking service 125. The owner device 110 is assigned to an owner 130, and the friend device 115 is assigned to a friend 135.

Access to the motor vehicle 105 may include, in particular, opening a door or a flap or driving with the motor vehicle 105. The owner 130 is permitted to have the motor vehicle 105 available to them and, in particular, to pass on a permission to use the motor vehicle 105 to the friend 135.

The owner 130 and the friend 135 preferably include natural persons, who are each able to use the motor vehicle 105 in a predetermined manner. The manufacturer service 120 may be operated by a manufacturer of the motor vehicle 105. The manufacturer can also be referred to as an OEM, and the manufacturer service 120 can also be referred to as an OEM server 120. Information about the motor vehicle 105 and one or more persons assigned to it may be stored in the manufacturer service 120. The tracking service 125 has the task of tracking or documenting keys with which the motor vehicle 105 can be used. The tracking service 125 can also be referred to as the key tracking server. It should be noted that names used herein are based on the above-mentioned standard of the Digital Car Key. The intention is to match the names or terms used there.

A control apparatus 140 set up to control access to the motor vehicle 105 is provided on board the motor vehicle 105. A predetermined safety function, for example, an unlocking, an opening or a driving of the motor vehicle 105, can be controlled or made possible only after the control apparatus 140 has been presented with an appropriate digital key.

FIG. 1 further shows a method 200 for controlling access to the motor vehicle 105. Method steps are shown as arrows between elements of the system 100. The method 200 may be part of an access control process described in the context of the Digital Car Key. It is proposed to extend the access control described in the standard through the transmission of additional information in the method 200 described below.

In a step 205, the owner 130 can transmit a configuration to the friend 135, the configuration containing information about which motor vehicle 105 is to be used in what manner with a digital key to be created.

In a step 210, the friend device 115 can generate a key that corresponds to the given configuration. In a step 215, the generated key can be transmitted from the friend device 115 to the owner device 110 for signing.

In a step 220, the owner device 110 of the owner 130 can digitally sign the transmitted key of the friend device 115 cryptographically. In a step 225, the owner device 110 can transmit an import request together with an attestation package to the friend device 115. The attestation package may contain information about what further steps must be taken by the friend device 115 to validate the generated key.

In a step 230, the friend device 115 can transmit the attestation package together with a tracking request to the tracking service 125. The tracking service 125 can inform the manufacturer service 120 of the received tracking request in a step 235. Subsequently, in a step 240, predetermined data related to the key of the friend device 115 can be exchanged between the manufacturer service 120 and the tracking service 125. In a step 245, the tracking service 125 can sign the generated key of the friend device 115. In addition, the tracking service 125 can store information about the generated or signed key in order to enable tracking.

In a step 250, the key can be transmitted together with the attestation package from the tracking service 125 to the friend device 115. In addition, in a step 255, the manufacturer service 120 can transmit the attestation package directly to the motor vehicle 105. It should be noted that this step may not be carried out in some circumstances, if there is no communication link between the manufacturer service 120 and the motor vehicle 105, for example, because the motor vehicle 105 is parked in an underground parking garage where it is not possible to access a mobile network.

In a step 260, the friend device 115 is at a communication distance from the motor vehicle 105. Information which may include identification of the key of the friend device 115 and the attestation package can be exchanged. Such an initial data transfer is known in the Digital Car Key standard as the Friend First Approach. It should be noted that actual authentication between the friend device 115 and the motor vehicle 105 can only take place later.

In a step 265, the friend device 115 can be authenticated with respect to the motor vehicle 105. In addition, the attestation package can be checked by the motor vehicle 105. If the authentication and the check are positive, access of the friend device 115 to the motor vehicle 105 can be controlled depending on the additional information transmitted.

In a step 270, a message can be sent to the tracking service 125, which indicates that a digital key could for the first time be successfully authenticated with respect to the motor vehicle 105 and attestation packages assigned to the key were successfully checked.

Figure 2:
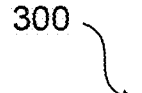
FIG. 2 illustrates a flowchart of a second method.
Figure 2:
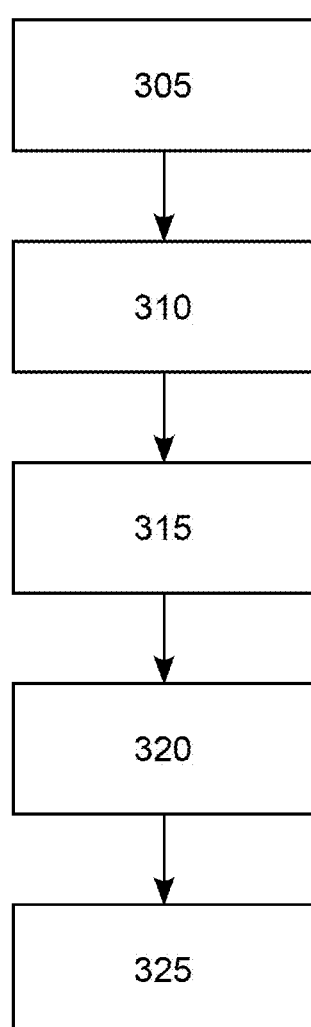

FIG. 2 shows a flowchart of a second method 300, which can be integrated or interleaved with the first method 100. The second method 200 is preferably carried out at least in part by the tracking service 125. A first step 305 may correspond to step 230. A tracking request accompanied by a new digital key and several attestation packages is received here.

In step 310, the last authenticated key in a chain that includes the new key can be determined. Typically, the new key is the last link in this chain. The keys of the chain may be known on account of previously received tracking requests 230. The keys that are already authenticated may be known through messages 270 received previously.

In step 315, it is determined whether the key is in the chain of keys taken as a basis for generating the new key. Steps 310, 315 can be used to determine a key that has already been used for authentication and that is the smallest distance ahead of the new key in the chain. In step 320, attestation packages signed with the specific key can be removed from the chain of attestation packages that is attached to the new key.

In a step 325, the new key and/or the attestation packages can be signed by the tracking service 245. This step may correspond to step 245 of the second method 200. In a step 325, the new key and remaining attestation packages can be transmitted to the friend device 115. This step may correspond to step 250. In addition, the key and/or the attestation packages can be transmitted via the manufacturer service 120 to the motor vehicle 105, as described with respect to steps 240 and 255 in the first method 200.

Figure 3:
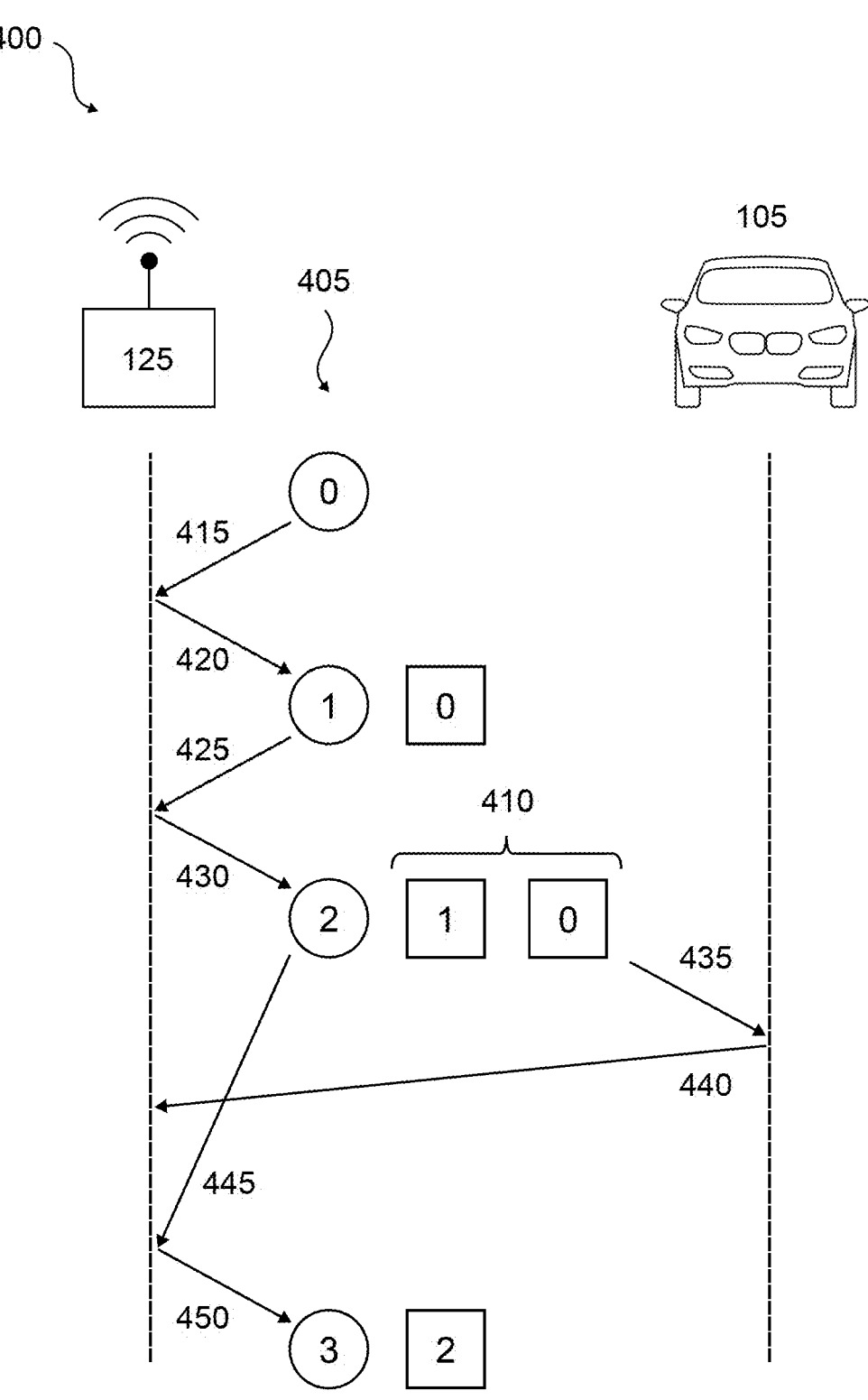
FIG. 3 illustrates a sequence in the formation of a key chain.

FIG. 3 shows an exemplary sequence 400 in the formation of a key chain 405. A chain 410 of attestation packages is assigned to one element of the key chain 405. In a left-hand region, the tracking service 125 is symbolized as a vertical line; in a right-hand region the motor vehicle 105 is symbolized as a further vertical line. A time runs along the lines from top to bottom. A time runs along the lines from top to bottom.

Between the lines, keys are indicated by round symbols and attestation packages are indicated by square symbols. The symbols contain numbers that correspond to one another. For example, an attestation package with the number zero is signed with the key of the same number.

Initially, there is only a digital key zero, which has no predecessor and is considered to be authenticated with respect to the motor vehicle 105. Key zero can be used directly in order to use the motor vehicle 105. The following procedures are illustrated in a simplified manner in places compared to methods 200 and 300.

A key one is created based on key zero. To do this, a tracking request is made to the tracking service 125 (or the system 100) in step 415. In step 420, a corresponding tracking response is given. An attestation package zero is assigned to key one.

A further key two is created based on key one. For this purpose, a tracking request can be made again in step 425 and a tracking response can be given again in step 430. An attestation package 1 is assigned to key two. By means of attestation package 1, key two can be traced back to key one. Attestation package zero is also required; it can be used to return key one to key zero. The key chain 405 can now have three entries (two if the initial key zero is not counted), and the chain 410 of attestation packages can have two entries.

In the present example, in a step 435, key two is now presented together with attestation packages one and zero at the motor vehicle 105, and authentication and successful checking of the attestations take place. In a step 440, the motor vehicle 105 informs the tracking service 125 about this.

In a step 445, a new key three is created based on key two. To this end, a tracking message is sent to the tracking service 125. It is known there that key two has already been authenticated at the motor vehicle 105. Therefore, those entries that precede key two can be removed from the chain 410 of attestations without sacrificing security. In step 450, only attestation package two is assigned to key three in a tracking response. A user can access the motor vehicle 105 by presenting key three and attestation package two. Previous attestation packages of the chain 410 are not required.

REFERENCE SIGNS

100 System
105 Motor vehicle
110 Owner device
115 Friend device
120 Manufacturer service (OEM server)
125 Tracking service (key tracking server)

130 Owner
135 Friend
140 Control device
200 First method
205 Request to generate a key, with configuration
210 Friend device generates key with entitlement
215 Prompt to sign the key
220 Owner device signs key
225 Import prompt with attestation package
230 Friend device sends tracking request to tracking service
235 Tracking service notifies manufacturer service
240 Exchange of shared key data
245 Tracking service signs key and stores the key
250 Tracking response: transmit signature and attestation package to friend device
255 Signature with attestation package from the manufacturer service to the motor vehicle
260 First contact of the friend device with the motor vehicle
265 Authentication, evaluate attestation package, grant access
270 Indication of first successful authentication with new key
300 Second method
305 Tracking request received
310 Determine last authenticated key
315 Key present in attestation chain?
320 Remove previous attestation packages
325 Signature and attestation packages to friend device
400 Sequence
405 Chain of digital keys
410 Chain of attestation packages
415 Tracking request
420 Tracking response
425 Tracking request
430 Tracking response
435 First contact with motor vehicle
440 Activation message
445 Tracking request
450 Tracking response The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling access to a motor vehicle, the method comprising:
   receiving a tracking request for a new digital key for the motor vehicle;
   wherein the new digital key is included in a chain of digital keys that have been created from one another;
   wherein the tracking request includes a chain of attestation packages that are assigned to the digital keys in pairs;
   determining that a first digital key to which one of the attestation packages of the chain is assigned has already been authenticated with respect to the motor vehicle;
   removing from the chain an attestation package that is assigned to a second digital key that precedes the first digital key in the chain; and
   providing a tracking response with at least one remaining attestation package of the attestation packages.

2. The method according to claim 1, wherein all attestation packages that are assigned to any digital key that precedes the first digital key in the chain are removed from the chain.

3. The method according to claim 2, wherein the first digital key that is already authenticated with respect to the motor vehicle precedes the new digital key most closely in the chain.

4. The method according to claim 2, further comprising receiving a message indicating that the first digital key has been authenticated with respect to the motor vehicle.

5. The method according to claim 1, wherein the first digital key that is already authenticated with respect to the motor vehicle precedes the new digital key most closely in the chain.

6. The method according to claim 1, further comprising receiving a message indicating that the first digital key has been authenticated with respect to the motor vehicle.

7. The method according to claim 6, wherein the message is received only after a first authentication of the first digital key with respect to the motor vehicle.

8. The method according to claim 6, wherein the message indicates that attestation packages assigned to the first digital key have been successfully checked by the motor vehicle.

9. The method according to claim 1, wherein the tracking response is signed before being provided.

10. The method according to claim 1, wherein the new digital key is authenticated with respect to the motor vehicle and attestation packages assigned to the new digital key are successfully checked by the motor vehicle.

11. The method according to claim 10, wherein access to the motor vehicle is permitted.

12. The method according to claim 11, wherein the new digital key and the attestation packages assigned to the new digital key are transmitted wirelessly to the motor vehicle.

13. The method according to claim 10, wherein the new digital key and the attestation packages assigned to the new digital key are transmitted wirelessly to the motor vehicle.

14. A tracking service for tracking a digital key for controlling access to a motor vehicle, the tracking service comprising:
   a first interface for receiving a tracking request for a new digital key for the motor vehicle;
   wherein the digital key is included in a chain of digital keys that have been created from one another;
   wherein the tracking request includes a chain of attestation packages that are assigned to the digital keys in pairs;
   a processor configured to determine that a first digital key to which one of the attestation packages of the chain of attestation packages is assigned has already been authenticated with respect to the motor vehicle, and to remove from the chain of attestation packages an attestation package that is assigned to a digital key that precedes the first digital key in the chain; and
   a second interface for providing a tracking response with at least one attestation package.

15. A system comprising a tracking service according to claim 14 and a motor vehicle including a control apparatus configured to grant access to the motor vehicle when a new digital key has been authenticated and a chain of attestation packages assigned to the key has been successfully checked.

* * * * *